US007669246B2

(12) United States Patent
Jorgenson et al.

(10) Patent No.: US 7,669,246 B2
(45) Date of Patent: Feb. 23, 2010

(54) SYSTEM AND METHOD FOR LINKING USER ACCOUNTS TO BUSINESS ENTITLEMENT OBJECTS (75) Inventors: Daniel Scott Jorgenson, San Jose, CA (US); Joseph Gerard Moffat, Los Gatos, CA (US); Richard Paul Kane, Rocklin, CA (US); Christopher John Hoffman, Cupertino, CA (US); Ahmed Khattab, San Jose, CA (US); Nirmaladevi Kulandaivelu, San Jose, CA (US); Kathleen M. Cox, Antelope, CA (US); Thomas M. Graefe, Norwell, MA (US); Fabrizio Mancuso, Montbonnot St. Martin (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 876 days.

(21) Appl. No.: 10/869,765

(22) Filed: Jun. 16, 2004

(65) Prior Publication Data
US 2005/0283372 A1 Dec. 22, 2005

(51) Int. Cl.
*G06F 7/04* (2006.01)
*G06Q 10/00* (2006.01)
*G06F 17/30* (2006.01)

(52) U.S. Cl. .......................................... 726/28; 707/9
(58) Field of Classification Search ............ 726/26–30; 705/1; 707/9; 709/203, 250
See application file for complete search history.

(56) References Cited

U.S. PATENT DOCUMENTS

| 5,699,514 | A | * | 12/1997 | Durinovic-Johri et al. ..... 726/19 |
| 6,223,177 | B1 | * | 4/2001 | Tatham et al. .................... 707/9 |
| 6,615,258 | B1 | * | 9/2003 | Barry et al. .................. 709/223 |
| 6,901,387 | B2 | * | 5/2005 | Wells et al. .................... 705/64 |
| 7,054,923 | B2 | * | 5/2006 | Krishnamoorthy .......... 709/219 |
| 2002/0049627 | A1 | * | 4/2002 | Goli et al. ...................... 705/10 |
| 2002/0138389 | A1 | * | 9/2002 | Martone et al. ............... 705/36 |
| 2003/0093430 | A1 | * | 5/2003 | Mottur ......................... 707/10 |
| 2005/0149437 | A1 | * | 7/2005 | Zellner et al. ................. 705/39 |

* cited by examiner

*Primary Examiner*—Kimyen Vu
*Assistant Examiner*—Suman Debnath (57) ABSTRACT A system comprises a business entitlement object, a primary account associated with a first user, wherein the primary account is linked to the business entitlement object, a secondary user condition defined by the first user, and a first secondary account, wherein a second user links the first secondary account to the business entitlement object according to the secondary user condition.

25 Claims, 4 Drawing Sheets

SYSTEM AND METHOD FOR LINKING USER ACCOUNTS TO BUSINESS ENTITLEMENT OBJECTS

FIELD OF THE INVENTION

The embodiments disclosed herein relate in general to systems and methods for providing business entitlement object linking of user accounts in multi-user systems.

DESCRIPTION OF RELATED ART

A "business entitlement object" (BEO) is any conceptual object which represents an agreement by a system provider to provide users associated with the BEO access to certain system features or services. An example of a BEO is a product warranty, wherein the terms of the warranty provide the holder of the warranty access to an online information system for the period of the warranty. A similar example of a BEO is a support contract, wherein the terms of the contract give access to an online information system. A gift certificate is a third example of a BEO, wherein the terms of the certificate give the holder certain purchasing power within an online information system. A coupon is a fourth, similar example, illustrating that BEOs may take many forms in online business.

Security and usability are concerns with BEO providers. Providers who make access to system features entitled by the BEO more secure may find that their operational cost becomes unacceptable, or their users become frustrated because a security measure prevents those users from legitimate access. On the other hand, a provider who makes for easy access to system features entitled by the BEO may discover that illegitimate users are accessing the system. There is a need for tools that allow a comfortable balance between usability and security in systems where feature access is controlled by BEOs.

BRIEF SUMMARY OF THE INVENTION

According to at least one embodiment, a system comprises a business entitlement object, a primary account associated with a first user, wherein the primary account is linked to the business entitlement object, a secondary user condition defined by the first user, and a first secondary account, wherein a second user links the first secondary account to the business entitlement object according to the secondary user condition.

DETAILED DESCRIPTION

The embodiments disclosed herein provide techniques for users to self-regulate business entitlement object ("BEO") linking for managing feature access such that security and usability are optimized. For instance, embodiments described further below provide systems and methods for allowing users of an online service to self-regulate BEOs for managing access to features available via such online service. In an exemplary embodiment a primary user links a first account to a BEO and defines a set of secondary user conditions. Secondary users then link their accounts to the BEO according to the secondary user conditions, as described in more detail below.

Figure 1:
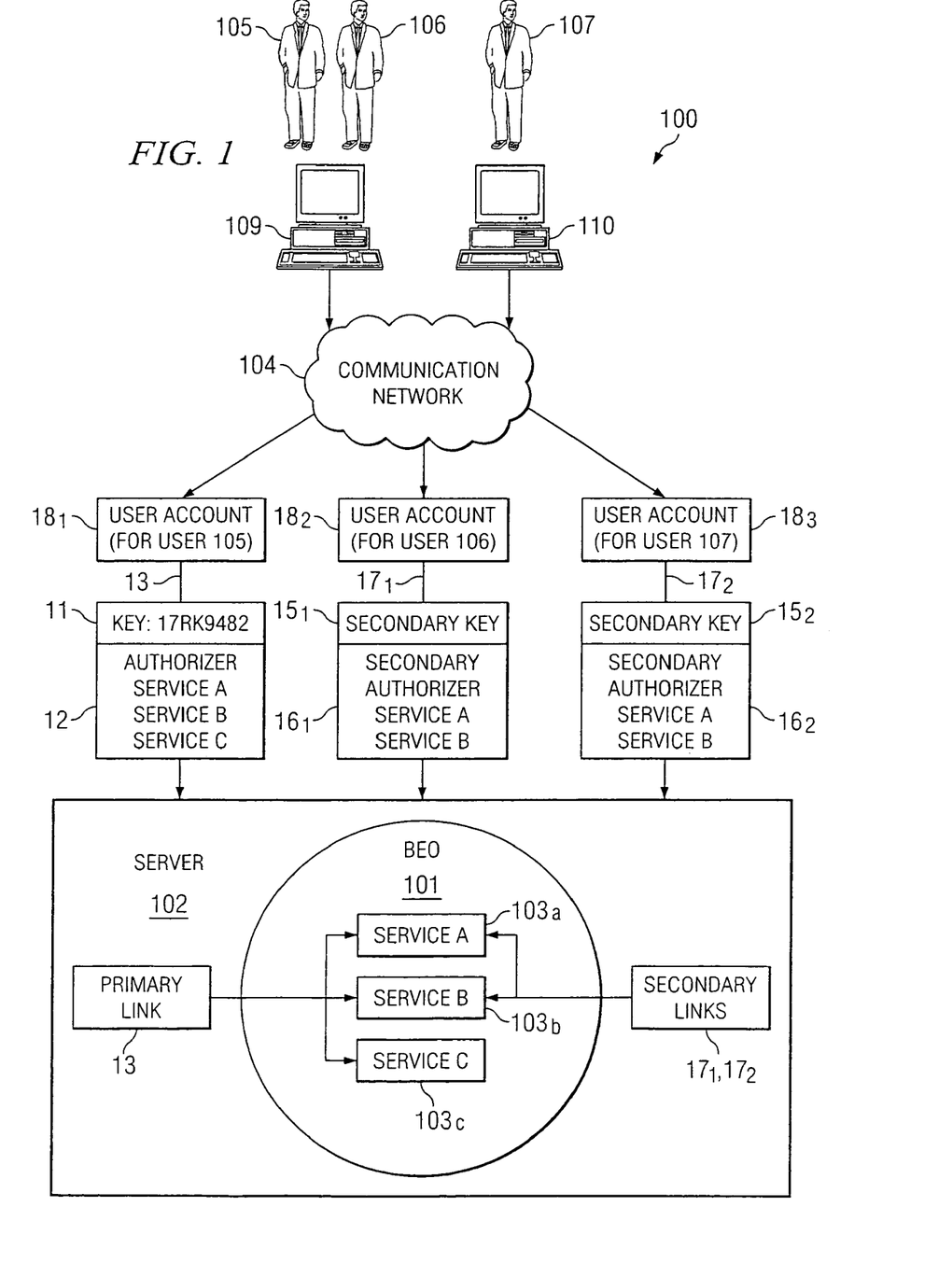
FIG. 1 is an illustration of one embodiment of a system adapted to employ user-regulated linking of user accounts to BEOs.

Turning to FIG. 1, an example online service system 100 is shown, which includes server 102 that is communicatively accessible by clients 105, 106, and 107 via client computers 109 and 110 and communication network 104. It is not necessary that each client use a separate client computer or that all use the same client computer. Any appropriate manner of client computer usage may be employed as desired, including, but not limited to, the manner illustrated in FIG. 1 wherein multiple clients (105 and 106) are users with respect to a single client computer (109).

Business entitlement object 101 is stored or cached on server 102. In general, BEO 101 identifies for one or more users (clients) those online services (features) provided by server 102 (or some other server) to which the users are entitled (authorized) to access. A BEO, such as BEO 101, generally employs attributes, including a key, such as key 11, and an authorizer, such as authorizer 12. By "attribute" is meant one or more pieces of data characterizing the BEO according to the specified purpose of the attribute. The BEO may have more attributes, but in this example, only two attributes will be the focus (i.e., key 11 and authorizer 12).

Keys, such as key 11, are usually one or more string values that, in conjunction, are unique to instances of the BEO class within the BEO provider's system; thus the key attribute serves to identify the BEO instance. Keys are also usually pseudo random and obscure (i.e., difficult to guess), such that a user who presents knowledge of the proper value(s) can be assumed by the system to be a legitimate holder of the corresponding BEO. In this manner, keys function as a type of BEO ID and password, assigned by the BEO provider and delivered to the user, which, when later presented by a user, identify the user as a legitimate accessor of whatever services are conveyed by the authorizer. An example key 11 is shown as "17RK9482" in FIG. 1. Keys may be assigned and delivered by providers to users in numerous ways. In one example, a BEO service provider may allow a BEO customer to purchase the BEO via the World Wide Web, but may send a key to the customer via the United States Postal Service. In another example, a BEO customer may both purchase the BEO and obtain its key via the Web. In a third example, the customer may purchase the BEO in person and receive delivery of the key via e-mail. All means of generating, assigning and delivering BEO keys to users are within the scope of embodiments disclosed herein.

FIG. 1 also shows example authorizer 12. Authorizers are usually one or more string values that, directly or indirectly, indicate the services (i.e., features) within the system to which the BEO 101 entitles a legitimate holder to access. For example, in FIG. 1, authorizer 12 lists services A, B, and C (which are services 103a-103c entitled by BEO 101) as being the services to which the holder of key 11 for BEO 101 is entitled. When user 105 supplies key 11, BEO server 102 determines that user 105 is authorized to access services 103a through 103c as specified by the corresponding authorizer 12. Thus, by being unique, pseudo-random and obscure, keys may provide security in that they restrict access to services 103a-103c to authorized users. That is, it is difficult for an unauthorized user to guess the key 11 to obtain access to services 103a-103c.

For example, user 105 holds a service contract represented by BEO 101 and further has key 11, assigned out-of-band by the BEO provider, which uniquely identifies the service contract BEO 101. BEO server 102 then prompts user 105 to identify key 11, comparing it with an internal store of known keys for recognition (such store being located on server 102 or another server, e.g. a database server, communicatively connected to server 102). In this example, key 11 is the service contract number. Thus, since it is assumed that generally only legitimate users have access to these BEO keys, the risk of fraud through unauthorized access is assumed to be reduced.

Continuing this example, a second attribute of service contract BEO 101 is authorizer 12, which identifies a list of support services (i.e., online features) 103a-103c to which a legitimate holder of BEO 101 (such as user 105) is entitled, such as technical databases, downloadable patches, etc. If, for example, though, the service contract does not provide for downloadable patches, then authorizer 12 would not identify a list that includes such patches. Thus, a user who presents key 11 for BEO 101 by implication is entitled to access those services among 103a-103c which are identified by authorizer 12.

The precise nature of keys 11 and authorizers 12 varies between systems. In some systems, key 11 and authorizer 12 may be packed into a single datum with multiple subfields containing the key and authorizer. In others, they may be distinct, and indeed may each comprise single or multiple data elements. Key and authorizer data itself is based on numeric, string, or other data types. Furthermore, in some systems user 105 is provided with both key 11 and authorizer 12, and presents both to BEO server 102 (the authorizer 12 typically being protected with a data-integrity check in this case, to prevent fraud). In others, user 105 is provided with, and presents, merely key 11; following successful key authentication, authorizer 12 is accessed by BEO server 102 from an internal store of authorizers corresponding to known keys (such store being located on server 102, or another server, e.g. a database server, communicatively connected to the server 102). Finally, in some systems user 105 directly experiences the actual data value(s) of key 11 and/or authorizer 12, being given them by the system provider and then presenting them to the system for authentication (for example, by copying them into an online form presented by BEO server 102). In other systems, the user may not experience these data value(s) directly, conforming instead to a different kind of access system: for example, machine code written to a card, which is swiped by a reader connected through a computer workstation (such as client computer 109) to BEO server 102 via the Internet. Many methods to manifest keys and authorizers exist, and any such method now known or later developed may be employed for use in embodiments described herein.

Building upon this example, server 102 provides BEO 101 and further allows linking. In such a system, user 105 initially accesses BEO 101 by presenting key 11, and designates with it separate user account $18_1$, usually accessed by user 105 through use of a credential such as user ID and password, client digital certificate, etc. Many such techniques for credentialed user authentication exist and are in keeping with the various embodiments described herein. A linking system may then associate BEO 101 with that user account $18_1$, such that user 105 would not need to reenter key 11 on subsequent times user 105 accesses services 103a-103c entitled by BEO 101. Such a link is represented by item 13 in FIG. 1. In short, linking is associating a user account, such as account $18_1$, with a BEO, such as BEO 101, and allowing the user to access the services, such as services 103a-103c, entitled by BEO 101, through his or her user account credentials, while enjoying the convenience of avoiding repetitive presentation of BEO key 11. Furthermore, nothing in this description of linking limits user accounts to being linked with a single BEO. It is within the scope of embodiments to allow user accounts to accumulate links to multiple BEOs, thereby allowing all such BEOs' entitled services to be accessed by user 105 through the credential for a single linked user account $18_1$, and thus enhancing the user's convenience.

For example, a service contract or other BEO 101 is linked by user 105 to his or her account $18_1$, after which future sessions with server 102 grants user 105 access to the features (e.g., 103a-103c) entitled by that support contract or other BEO 101 with the use of a password or similar user account credential for account $18_1$, instead of requiring the user to supply key 11 each time. Thus, even though users 105 and 106 share client computer 109, BEO access may still be available to user 105 while excluding user 106 through use of a password for account $18_1$ in a more convenient manner than requiring user 105 to renter key 11. One example of an account which may be linked to a BEO is an on-line customer account provided by a vendor to a customer who buys services from that vendor. For example, the vendor may provide accounts to its customers allowing the customers to check payment balances and to view new products over the internet. If the customer then purchases a service contract BEO from the vendor, the vendor's BEO server may then allow the customer to link his customer account to the BEO.

Linking is often beneficial to BEO system providers since it is performed by users themselves. Rather than requiring the BEO provider to invest in setting-up properly-linked user accounts on behalf of users, users may be able to set themselves up once provided out-of-band BEO key(s) 11 that they need.

Linking also often enhances usability: since BEO keys are generally assigned by the BEO system provider, and not by the user (unlike passwords, client certificates, and other forms of user credentials, which are generally controlled by the user), they are naturally more difficult for users to remember and present. By using key 11 once to link BEO 101 to a user account, then basing all subsequent access to services 103a-103c on the credentials for that user account rather than key 11, the result is usually an easier-to-use system.

Thus, linking may minimize operational cost and increase usability by making it easier for legitimate users to access the features entitled by BEO 101 on an ongoing basis. However, unregulated linking may also entail security vulnerabilities by not addressing the risk of illegitimate users accessing the features entitled by BEO 101. Specifically, if a valid BEO key is possessed by an illegitimate user (e.g., in the case in which the key is lost, or in the case in which the key is retained by a formerly-legitimate user), unregulated linking may not prevent that user from acquiring unauthorized access. Yet the more linking is regulated by the system to safeguard against such scenarios, the more usability may be impacted for legitimate users, and the operational cost to the provider may also be increased.

For example, a traditional linking system may regulate linking by involving the provider to validate links additionally (i.e. beyond the key authentication already described):

either after the user establishes the link, or even before the user establishes a link (e.g., when the user requests that a link be established, or when the provider establishes a link on a user's behalf). For example, a provider might confirm that the address of a linked user account reasonably agrees with the provider's purchase record for the BEO. Yet such "background check" approaches may require the provider's explicit manual involvement in the linking process, and may thus increase the operational cost of the system when compared to a system where users operate more independently of the provider. As a further example, another traditional linking system may regulate linking by setting certain automatic conditions on linking, such as the number of users who may link accounts to the same BEO, the network domain from which they must originate, the time period in which they must link, etc. However, when these conditions are imposed on users by the system, they may not anticipate users' individual and widely-varying business needs regarding who constitutes a legitimate user. Thus usability may be impacted to an undesirable degree.

To optimize these concerns with traditional linking systems regarding usability, operational cost, and security, in accordance with one embodiment, server 102 allows for user-regulated linking. In user-regulated linking, users who meet certain defined conditions (herein called "primary user conditions") and link their user accounts 18 to BEO 101 are designated "primary users" for BEO 101, such as user 105 in the example of FIG. 1. A primary user condition in this embodiment may be, for example, based on link sequence: the first user to link his or her account 18 to BEO 101 becomes the only primary user for BEO 101. However, other primary user conditions (i.e., for designating the primary user) are certainly possible. In some embodiments, for example, the first "n" users to link BEO 101 may satisfy a primary user condition. In other embodiments, all users from certain server-defined network domains may satisfy a primary user condition. In yet other embodiments, all users who link BEO 101 within a server-defined time period may satisfy a primary user condition. Primary user conditions are usually defined by BEO server 102 (i.e., by extension, the BEO system provider) and usually not by users. Embodiments described herein encompass any desirable primary user conditions that may be implemented by a BEO provider.

Further, in a user-regulated linking embodiment, BEO server 102 allows primary user(s) of BEO 101 to define conditions allowing additional links to BEO 101 (herein called "secondary user conditions"). Users who link their respective user accounts to BEO 101 successfully, subject to those secondary user conditions, are considered "secondary users" for BEO 101. For example, in one embodiment, primary users define a maximum number of secondary user links as a secondary link condition. In another embodiment, primary users define a certain network domain common to secondary users as a secondary link condition. In yet another embodiment, primary users define a time period over which secondary links can be established. In a fourth embodiment, primary users define whether secondary links are to be permitted at all. In any case, as opposed to primary user conditions, which are usually server-defined, secondary user conditions are usually primary-user defined (albeit within a range of freedom defined by BEO server 102 and, by extension, the BEO system provider). Embodiments described herein encompass any desirable secondary user conditions that may be defined by a primary user. Secondary users are usually not provided the full capabilities of primary users: specifically, secondary users usually do not get to define which services they may access from the BEO or define secondary user conditions.

In FIG. 1, for example, the primary user condition is that only the first user to successfully link BEO 101 is the primary user. Thus, only account $18_1$ of user 105 is primary with respect to BEO 101, since in this example user 105 was first to present key 11 to BEO server 102 for linking. User 105, as primary user, accordingly may then define a secondary user condition, which in the example of FIG. 1 specifies that up to two additional users may themselves link their respective user accounts to BEO 101 and be considered secondary. These users, primary and secondary, may then access those services among 103a-103c entitled to them by BEO 101, where after linking such access obtains via their customary user account credentials, just as in a traditional linking system.

Note that other embodiments may use different primary and/or secondary user conditions entirely, as previously described. In fact, multiple primary and/or secondary user conditions may exist in some embodiments; for example, one embodiment might allow primary users to define secondary user conditions on the basis of both the number of secondary users, and their network domain. In such a system, for instance, a primary user might allow up to two secondary users (a first secondary user condition) from within a certain network domain only (a second secondary user condition).

Note also that the designations "primary" and "secondary" with respect to a user refer only to that user's relationship with a particular BEO. Consequently, in a system which allows users to link multiple BEOs, a user might be a primary user with respect to some of his or her linked BEO's and a secondary user with respect to his or her other linked BEO's.

Returning to the example, BEO server 102 thus allows secondary users 106 and 107 (through client computers 109 and 110, respectively, and through communication network 104) to establish secondary links $17_1$ and $17_2$ once primary user 105 has designated that additional linking is allowed for up to two secondary users. The manner in which secondary links $17_1$ and $17_2$ are established may vary from one embodiment to another. Moreover, it is a feature of certain embodiments that in a user-regulated linking scheme those secondary users 106 and 107 may link their user accounts $18_2$ and $18_3$, respectively, to BEO 101 with no further action needed from primary user 105. For example, in some embodiments, in addition to setting the secondary user conditions, primary user 105 may instruct BEO server 102 to generate two secondary keys $15_1$ and $15_2$. User 105 may then give those secondary keys $15_1$ and $15_2$ to users 106 and 107, allowing users 106 and 107 to designate secondary accounts and establish links $17_1$ and $17_2$ themselves using the new keys. In other embodiments, users 106 and 107 establish secondary accounts and links $17_1$ and $17_2$ themselves using the same BEO key 11 as primary user 105 employed originally; primary user 105 needs first only to set the secondary user conditions (i.e., no additional key generation and distribution to secondary users thereof is involved, so that the primary and secondary users may be completely disengaged from one another). Allowing secondary users to link themselves with little or no further action required from primary users may shift an administrative burden from primary users to secondary users, thus increasing usability for primary users.

Finally, in some embodiments primary user 105 may also have capabilities to limit authorizers 12 on BEO 101 to certain secondary users 106 or 107 who meet certain secondary user conditions. Unlike other secondary user conditions, which may limit the ability of secondary users to link BEO 101, such capabilities instead limit authorizers 12 that apply to secondary user 106 and/or 107 once he or she has linked BEO 101. Restricting authorizers 12 in turn restricts the number of features (e.g., some or all of 103a-103c) which will be provided to secondary users 106 and 107; in this way primary user 105 is given a more finely-grained means of access control over secondary users 106 and 107. For example, in some embodiments user 105 may give newly-generated secondary keys 15₁ and 15₂ to users 106 and 107, respectively, and those keys 15₁ and 15₂ may contain (or correspond to) authorizers 16₁ and 16₂, respectively, which allow users 106 and 107 to access services 103a and 103b but not service 103c. In other embodiments, user 105 may instead correspond such restricted authorizers 16₁ and 16₂ to the original key 11 when that key is used by secondary users 106 and 107 to link the BEO 101 (thus new key/authorizer distribution from primary to secondary users is obviated, allowing users to operate independently of one another, as previously noted). In ways like these, the access of secondary users 106 and 107 may be restricted by primary user 105.

Figure 1A:
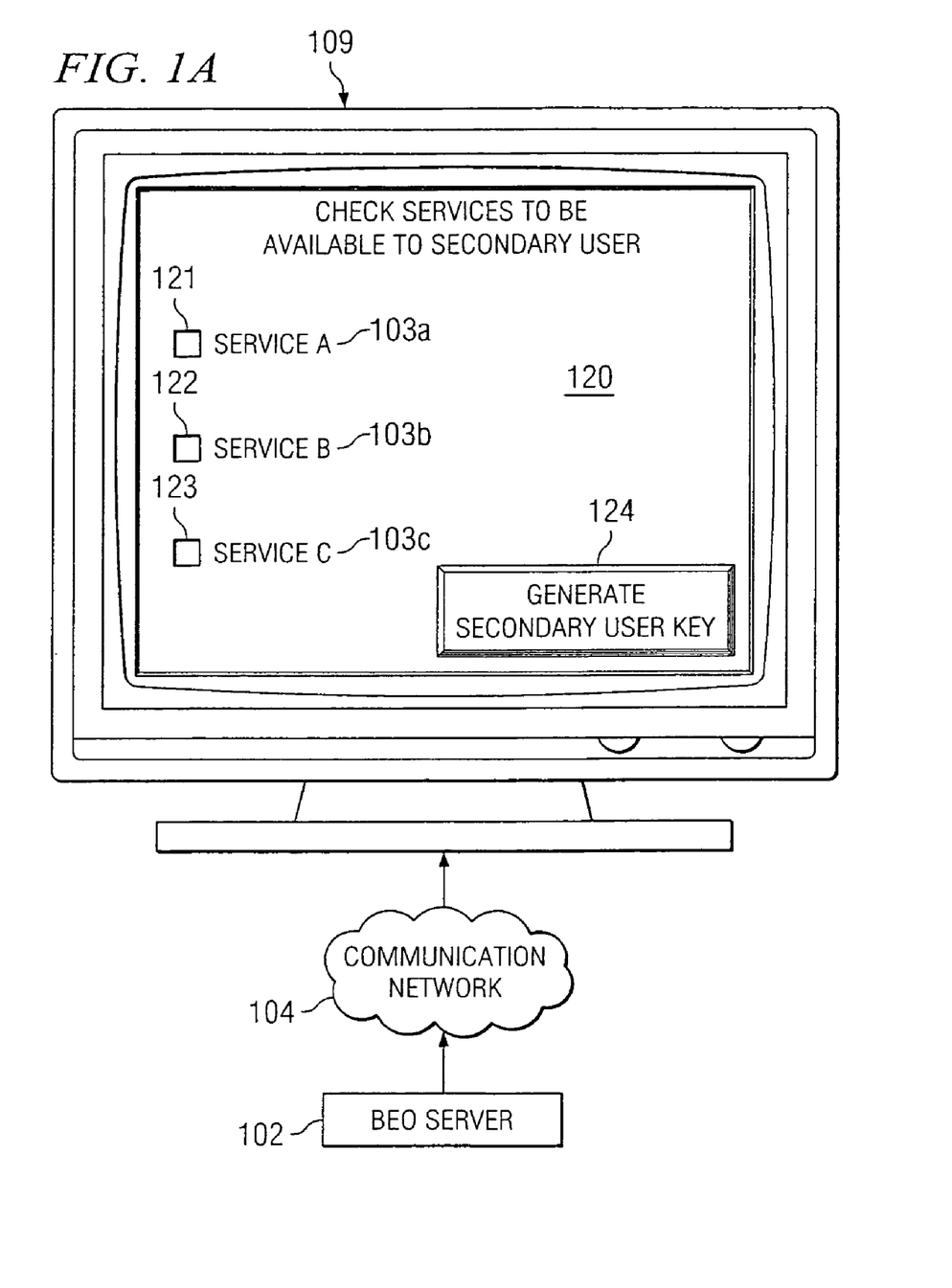
FIG. 1A illustrates a graphical user interface for allowing a primary user to selectively restrict authorizers for a secondary user.

FIG. 1A illustrates graphical user interface 120 for allowing a primary user to selectively restrict the authorizers for a secondary user. In this example, interface 120 runs on server 102, and is accessed by primary user 105 at client computer 109 via communication network 104. Interface 120 allows primary user 105 to select services to be available to a secondary user by checking boxes 121, 122, and/or 123 (building upon the example of services 103a, 103b, and 103c, respectively, shown in FIG. 1). For example, primary user 105 may desire to selectively restrict the authorizers of secondary user 106, as in the example above. Primary user 105 then checks boxes 121 and 122, but not 123, such that user 106 may access services 103a and 103b, but not 103c. Primary user 105 then generates authorizer 16₁ which allows access to those specified services 103a and 103b, by clicking button 124. The new authorizer 16₁ may then be disposed with in a manner according to the embodiment. As discussed previously, for example, in some embodiments it may be distributed to secondary user 106 as part of (or corresponding to) a new key 15₁, for secondary user 106 to use when establishing secondary link 17₁. In other embodiments it may be stored internally on BEO server 102 (or an associated database server) for use when secondary user 106 links with key 11. While FIG. 1A is an example of a graphical user interface accessible at a client computer over a communication network, other applications may exist within the scope of embodiments for selectively restricting authorizers.

Thus, embodiments of user-regulated linking which allow primary users to define secondary user conditions, while allowing secondary users to link to the BEO with little or no further action on the part of primary users, allow BEO customers to operate independently and balance usability and security themselves. These embodiments offer one or more aspects not found in traditional linking systems. First, by allowing users—primary and secondary—to operate independently of provider validation (i.e., "background checks"), operational cost for the provider may be minimized. Second, by defining primary user conditions, providers may be able to ensure a common denominator of security across all their users. Third, since primary users are given a degree of freedom in defining secondary user conditions, users may be able to flexibly customize the conditions imposed on secondary users to meet their particular business needs, which may improve usability.

In fact, users commonly share some of the same security goals as the provider, and this flexibility offered by some embodiments may allow users to contribute to those shared goals in balance with their particular business needs. For example, in many embodiments, a BEO provider sets primary user conditions quite restrictively to maximize security with respect to primary linking of BEOs. In some traditional linking systems, this may impact usability for some users whose legitimate business needs were more expansive than the primary user conditions alone would allow (as previously discussed). However, with many embodiments of a user-regulated linking system, each primary user is able to designate secondary user conditions within a range of freedom (set by the BEO provider in certain embodiments) in order to expand the opportunity for colleagues to establish secondary links to the same BEO as the business needs of the user and his or her colleagues demand. Such secondary user conditions may include, but are not limited to, the number of allowed secondary links, the common network domain from which secondary users must come, the time period given secondary users to establish such links, or the services that those secondary users are authorized to access. Since many users may typically be as security-conscious as their providers (regarding illegitimate access to features entitled by their BEOs), such users may especially appreciate being able to strike a balance between their usability and overall security with such embodiments.

Figure 2:
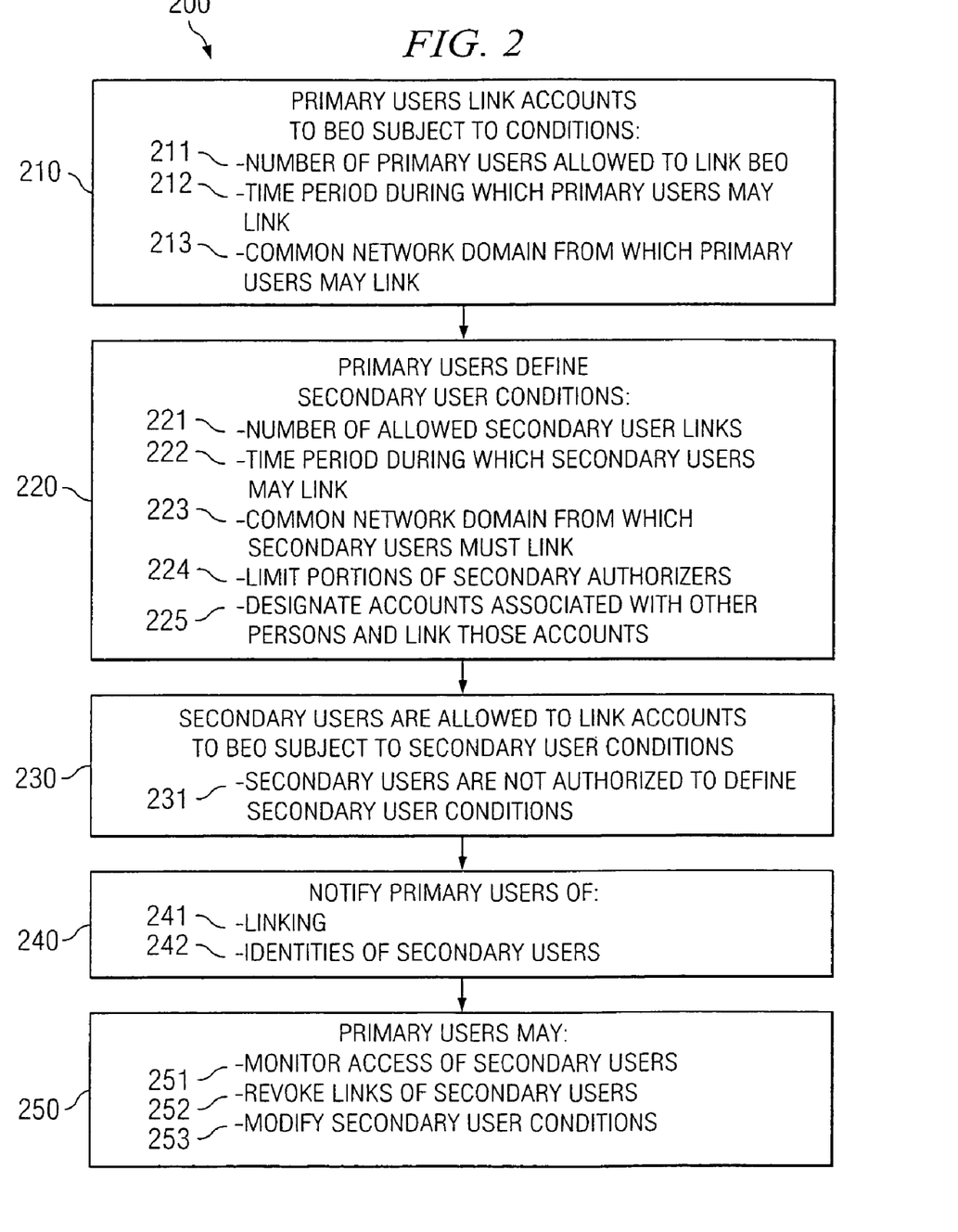
FIG. 2 is an operational flow of one embodiment for performing user-regulated linking of user accounts to BEOs.

FIG. 2 depicts operational flow 200 for performing user-regulated linking according to at least one embodiment. This embodiment allows access by linked secondary user accounts to system features entitled by a BEO, and optimizes security and usability performance.

First, in operational block 210, primary users, such as user 105, present their keys 11 to link their accounts to BEO 101 subject to primary user conditions 211, 212, and 213. Specifically, block 210 in this embodiment utilizes primary user condition 211, which limits the number of primary users who may link BEO 101 in this example. This embodiment also includes primary user conditions which limit the time period during which primary users may link BEO 101 (primary user condition 212), and the common network domain from which primary users are allowed (primary user condition 213). In general, however, any number, combination and kind of primary user conditions, such as conditions 211, 212, and 213, may be so employed in various embodiments described herein. Such primary user conditions are typically defined by the system provider, and not by primary users themselves, so that system providers may establish a common security baseline for access to services entitled by BEOs.

Note that a user (such as user 105) who attempts to link BEO 101 (for example, by presenting key 11 to server 102) and who satisfies all of the primary user conditions 211-213 in block 210 is considered a primary user for BEO 101 in this embodiment. Conversely, a user who attempts to link BEO 101 and fails any of the primary user conditions 211-213 of block 210 is not considered a primary user for BEO 101 in this embodiment. Other embodiments within the scope of user-regulated linking may utilize alternate logic when multiple primary user conditions are defined (for example, allowing the satisfaction of any one primary user condition to suffice for primary linking). Furthermore, single or multiple primary users for BEO 101 are in keeping with the scope of the various embodiments described herein.

Next, this example embodiment of FIG. 2 allows primary users to define secondary user conditions 221-223 in block 220. Such secondary user conditions are typically defined by primary users, but within a range of freedom defined by the service provider, so that primary users may securely extend access to their colleagues (thus enhancing usability vis-à-vis traditional linking). In this embodiment, primary user 105 designates the number of allowed secondary user links, as in secondary user condition 221. For example, primary user 105 may designate (per secondary user condition 221) that up to ten secondary user accounts are allowed to link to BEO 101. Alternatively, primary user 105 may designate an unlimited number of secondary user links. Still farther, primary user 105 may limit the number of secondary users to zero, which would be the equivalent of disabling the secondary linking properties of the system. In this embodiment, primary user 105 also designates a window of time in which all secondary users 106 and 107 must link if they so desire, as in secondary user condition 222. For example, primary user 105 may define (per secondary user condition 222) that any secondary users must link during a seven day period. In this embodiment, primary user 105 lastly defines (per secondary user condition 223) that any secondary users must originate from a common network domain. For example, primary user 105 may define (per secondary user condition 223) that any secondary users for BEO 101 must originate within the same network domain as the primary user.

In addition to such secondary user conditions as 221, 222, and 223, which regulate linking committed by secondary users, other forms of secondary user condition are within the scope of embodiments. Secondary user condition 224 allows primary user 105 to limit the portion of authorizer 12 for BEO 101, which limited portion secondary user 106 or 107 will inherit upon establishment of a secondary link to BEO 101. For example, primary user 105 limits the authority of access to services 103a-103c, which authority BEO 101 generally gives, so that secondary users may only access services 103a and 103b as in FIG. 1. Still further, it is within the scope of embodiments to allow primary user 105 to designate accounts associated with other persons and to link those accounts to BEO 101, as in secondary user condition 225. Secondary user condition 225 differs from those conditions which limit linking committed by secondary users themselves (such as conditions 221, 222, and 223), in that with condition 225 primary user 105 actually designates the user accounts of desired secondary users 106 and 107 and links those accounts secondarily to BEO 101 on their behalf. This is discussed more fully below. In any case, any number, combination and kind of secondary user conditions, such as conditions 221-223, are within the scope of the various embodiments described herein.

In block 230, secondary users are allowed to link their respective user accounts to BEO 101, subject to previously-set secondary user conditions 221-223. Specifically, user 106 or 107, who fails to link BEO 101 in this embodiment due to failure to meet any of its primary user conditions 211-213, but who satisfies all of the secondary user conditions 221-223 established by any primary user, such as user 105, for BEO 101, is allowed to link his or her user account to BEO 101 as a secondary user. Conversely, any user in this embodiment who fails one or more of secondary user conditions 221-223 established by a BEO 101 primary user(s) is not allowed to link to BEO 101 as a secondary user. Other embodiments within the scope of user-regulated linking may utilize alternate logic when multiple secondary user conditions are defined (for example, allowing the satisfaction of any one secondary user condition to suffice for secondary linking).

As shown above, it is within the scope of embodiments to allow a primary user, such as user 105, much latitude to define secondary user conditions, such as conditions 221-225, to control the number of secondary users 106 and 107 who may link their respective user accounts in block 230, to control the manner in which they may link in block 230, and to control the access level of those secondary users 106 and 107 who link in block 230. Note that if multiple primary users exist for BEO 101, and their individually-defined secondary user conditions conflict, such that a user satisfies one primary user's set of secondary user conditions but not another's, what happens regarding establishment of the secondary link may vary from one embodiment to the next. In one embodiment, for example, all secondary user conditions established by all primary users must be satisfied; thus the secondary link would be denied in such a case. In another embodiment, it is only necessary that at least one primary user's secondary user conditions be satisfied; thus the secondary link would be accepted in such a case. Any desired technique of resolving such conflicts may be employed within the scope of the embodiments described herein.

In some user-regulated linking embodiments, if a primary user, such as user 105, defines secondary user condition 221 to allow a number of secondary users, the system may allow secondary users, such as users 106 and 107, to establish links 17 of their respective user accounts to BEO 101 with no further action to be taken on the part of primary user 105 in block 230. The way this takes place may vary between embodiments. For example, consider primary user 105 for BEO 101, who has established secondary user conditions to allow secondary users 106 and 107 to link themselves secondarily to BEO 101 in block 230. In one embodiment, those secondary users 106 and 107 link their respective accounts $18_2$ and $18_3$ to BEO 101 as secondary users by entering into the system the original key 11 which primary user 105 initially used to link BEO 101. Alternatively, in certain embodiments the server 102 generates a number of keys $15_1$ and $15_2$ and distributes them (for example, by email), such that each new secondary user 106 and 107 enters one of keys $15_1$ and $15_2$ in linking their respective user accounts to BEO 101. These methods of allowing secondary users 106 and 107 to link their respective accounts $18_2$ and $18_3$ to BEO 101 are illustrative, and many other different methods may be used as desired.

In other user-regulated linking embodiments, secondary users 106 and 107 need not link their accounts $18_2$ and $18_3$ to BEO 101 at block 230 themselves. Rather, as shown with secondary user condition 225, primary user 105 may designate accounts $18_2$ and $18_3$ and create links $17_1$ and $17_2$ on behalf of secondary users 106 and 107. For example, primary user 105 may desire to allow secondary users 106 and 107 to access BEO 101. Accordingly, in an embodiment which implements secondary user condition 225, primary user 105 specifically designates and links user accounts $18_2$ and $18_3$ for users 106 and 107 as secondary user accounts for BEO 101, rather than framing other secondary user conditions to permit users 106 and 107 to establish such links $17_1$ and $17_2$ themselves.

In fact, in another embodiment, secondary user conditions 225 (in which primary user 105 links secondary user accounts $18_2$ and $18_3$ with BEO 101 on behalf of secondary users 106 and 107) and those like 221-223 (in which primary user 105 sets limits on the abilities of secondary users 106 and 107 to link their own accounts $18_2$ and $18_3$ themselves with BEO 101) may be combined in a single system. For example, primary user 105 may desire to allow secondary users 106 and 107 to access BEO 101. Primary user 105 may accordingly define secondary user conditions 221-223 to allow two secondary users. Primary user 105 may then designate and link account $18_2$ associated with user 106 to BEO 101. Independently, user 107 may link account $18_3$ to BEO 101 on his own by satisfying secondary conditions 221-223. As a result, each user 106 and 107 becomes a secondary user in a different manner. Methods in which primary users establish secondary users' links employing condition 225, and methods in which secondary users establish their own links as conditioned by primary users, are complementary. As such, any combination of such methods is within the scope of the various embodiments described herein.

Regardless of how secondary link 17 is established at block 230, user-regulated linking embodiments may include subsequent actions, too. In most embodiments, secondary users 106 and 107 are not authorized to define secondary user conditions for BEO 101, as in feature 231. This is in order to maintain the distinction between primary and secondary users, which distinction enables optimization of security versus usability in these embodiments of user-regulated linking, as has previously been shown. For example, primary user 105 may allow secondary user 106 or 107 to establish links $17_1$ and $17_2$, but secondary users 106 and 107 are not authorized to designate which services they may access outside the authorization of primary user 105 (secondary user condition 224). Nor may those secondary users 106 and 107 be authorized to set other secondary user conditions, such as the number of secondary links that may be established (secondary user condition 221), the time during which they must be established (secondary user condition 222), etc.

In some embodiments, primary user 105 may further receive notification of a secondary user's linking, as in features 241 and 242 of block 240. For example, primary user 105 may define secondary user conditions 221-223 to allow one secondary user. Secondary user 106 may then link account $18_2$ to BEO 101 according to the access that primary user 105 granted. Primary user 105 is then able to access server 102 and find out that secondary user 106 linked, as in feature 241, and also may be able to find out the identity of secondary user 106, as in feature 242. Further, primary user 105 may be able to monitor the access of secondary user 106 once secondary user 106 has linked, as in feature 251 of block 250.

Also in some embodiments, primary user 105 may revoke any of links 17 of accounts 18 of secondary users 106 and 107, as in feature 252. For example, primary user 105 allows secondary user 106 to link account $18_2$. Secondary user 106 then establishes link $17_1$. If primary user 105 then decides that secondary user 106 should not have access, primary user 105 then revokes link $17_1$ of secondary user account $18_2$ by defining secondary user conditions as such, as in feature 252. Note that for this to be effective, however, care must be taken to ensure that the other secondary user conditions 221-223 do not remain lax enough for revoked secondary user 106 to simply re-establish his or her link $17_1$ to account $18_2$. In one embodiment, it may be left to primary user 105 to ensure this. In another embodiment, BEO server 102 may apply some heuristics particular to revoked secondary user 106 to help ward against this. For example, in one embodiment, as part of feature 252, BEO server 102 may add account $18_2$ of user 106 to a revokee list maintained internally on server 102 (or a separate, communicatively-connected server). Linking features (such as feature 231) of this embodiment would then prohibit future linking by users (such as user 106) whose accounts (such as account $18_2$) are found within the revokee list.

It is also within the scope of embodiments to allow primary user 105 to modify secondary user conditions 221-225 after secondary user conditions have been set, as in feature 253 of block 250. For example, if primary user 105 defines secondary user condition 221 such that two secondary users may link, and there are two secondary user accounts $18_2$ and $18_3$ linked (associated with users 106 and 107, respectively), primary user 105 may desire to revoke link $17_1$ of secondary user account $18_2$ belonging to user 106 and then change secondary user condition 221 to allow only one secondary user in feature 253. Following the same example, primary user 105 may desire to add another user and may change secondary user condition 221 to allow three secondary users in feature 253 in order to accommodate another user account 18.

While altering secondary user conditions in feature 253 certainly affects future secondary linking, whether it also affects those secondary users who have already linked (per prior secondary user conditions) varies between embodiments. This issue is relevant when modifications to secondary user conditions are such that already-linked secondary users would not have qualified if the new secondary user conditions were in place at their time of linking. Such a situation would occur, for example, if primary user 105 were to use feature 253 to set the number of permitted secondary users (secondary user condition 221) from one to zero, after secondary user 106 had already established link $17_2$ in accordance with primary user 105's prior configuration of secondary user condition 221. In some embodiments, for example, secondary user conditions are only applied at the time of linking. In such embodiments, secondary user 106 would retain his or her link $17_2$ in this case. In other embodiments, secondary user conditions apply after linking as well; in these embodiments, secondary user 106 would lose his or her link $17_2$. Any desired technique of resolving such conflicts may be employed within the scope of the embodiments described herein.

Figure 3:
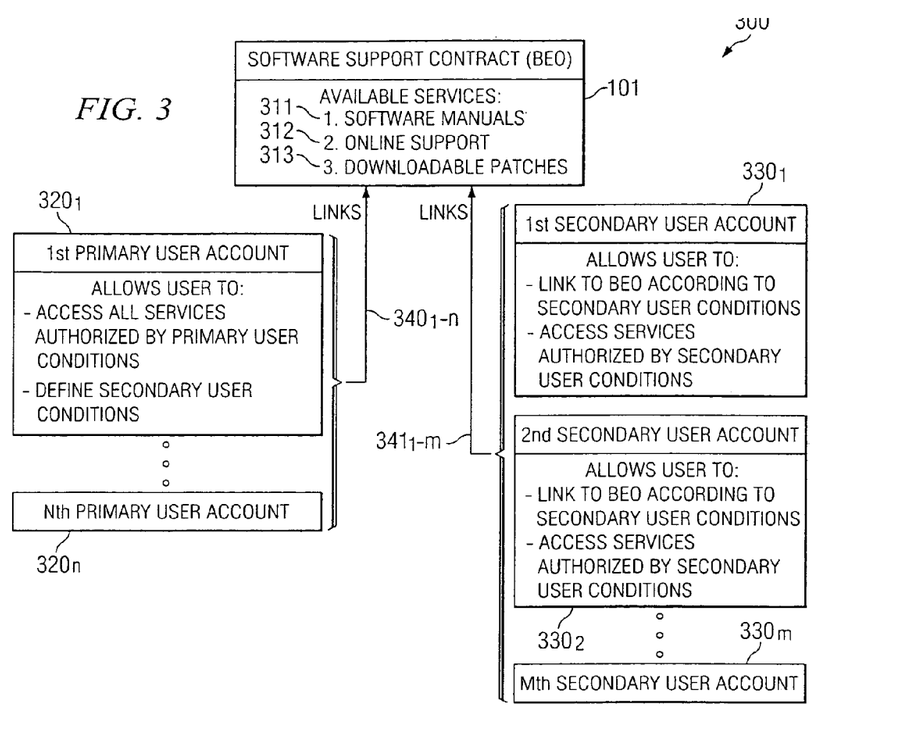
FIG. 3 is an illustration of a block diagram of one embodiment of a system employing user-regulated linking of user accounts to BEOs.

FIG. 3 illustrates a block diagram of an example system 300 adapted to employ user-regulated linking in accordance with at least one embodiment. In this example BEO 101 is a software support contract that has been purchased by a business. The terms of BEO 101 include access to software manuals 311, online support 312, and downloadable patches 313.

The business that purchased BEO 101 receives primary key 11, which the business' information technology supervisor uses to designate himself as primary user 105. For convenience, primary user 105 establishes link $340_1$ from primary user account $320_1$ to BEO 101. In this user-regulated linking system, there may be room for more than one primary user (e.g., information technology co-supervisors or other business supervisors), such that there exist other primary user accounts including $n^{th}$ primary user account $320n$. Those other primary user accounts may have links to BEO 101 similar to link $340_1$, resulting in "n" links $340_1$-$340_n$ (i.e., "n" different primary user accounts are linked to BEO 101).

For convenience, say that BEO server 102 has defined primary user condition 211 such that only one primary user, 105, is allowed to link. Primary user 105 desires to allow other users to have access to BEO 101. Accordingly, primary user 105 defines secondary user condition 221 to designate "m" secondary users who may link accounts, such as accounts $330_1$-$330_m$. Thus up to "m" secondary users (such as users 106 and 107, plus others if m is large enough) may then link those accounts $330_1$-$330_m$ to BEO 101 via links $341_1$-$341_m$. In this particular example, the secondary users are subordinate employees of the information technology supervisor (primary user 105). If primary user 105 desires more security, he or she may use primary user account $320_1$ to define secondary user condition 222 to designate a time period during which all secondary user accounts $330_1$-$330_m$ must be linked if at all. In this example, primary user account $320_1$ is used to designate a time period of ten days. Secondary users, such as 106 and 107, would have to link during that ten day period. If a user, such as 106 or 107, desired to link $m^{th}$ secondary account $330_m$ but did not link during the ten days, that user would not be able to link even though the number of authorized links may be large enough to accommodate at least one more user.

Building upon this example, note that secondary user conditions 221, 222 have allowed the information technology supervisor (primary user 105) to tailor what system 300 will permit in the way of secondary linking, without requiring the supervisor to necessarily identify and link his or her subordinates (secondary user accounts $330_1$-$330_m$) himself or herself. Instead, in this example, those users are permitted to link their accounts themselves, subject to the supervisor's restrictive secondary user conditions. If the supervisor desires even more security, however, primary user account $320_1$ may be used by the supervisor to utilize secondary user condition 225 to specifically designate his or her subordinates' accounts (secondary user accounts $330_1$-$330_m$), link them on their behalf, and then define secondary user conditions to disable further secondary linking committed by secondary users themselves. In this way primary user 105 can, according to his or her desire, maximally restrict user-regulated linking to BEO 101 within system 300. Thus, primary user 105, in some embodiments, has the ability to tailor the degree of secondary linking that occurs in order to meet their own business needs, as shown in this example, which demonstrates an advantage of various embodiments over traditional linking systems.

Keeping with the example in which primary user condition 221 allows one primary user, primary user 105 further desires to manage to some extent secondary user accounts $330_1$-$330_m$. Primary user account $320_1$ allows primary user 105 to exert some control over secondary user accounts $330_1$-$330_m$ by defining secondary user conditions. In this example, primary user 105 may define secondary user conditions to revoke links 341 of secondary user accounts $330_1$-$330_m$ or authorize the access privileges of secondary user accounts $330_1$-$330_m$. In this example, if an information technology supervisor (such as primary user 105) does not want the subordinate employees (such as users 106 and 107) to have access to downloadable patches 313, primary user account $320_1$ allows that information technology supervisor to restrict the access of any or all of secondary user accounts $330_1$-$330_m$ to patches 313. Further, an information technology supervisor may revoke link 341 of any or all of secondary user accounts $330_1$-$330_m$ if, for example, one of the subordinate employees is terminated. Moreover, if later the information technology supervisor desires to change the number of available secondary user accounts $330_1$-$330_m$, primary user account $320_1$ allows for modification of the number of designated secondary user accounts $330_1$-$330_m$ This feature could be used, for example, to match the number of secondary user accounts to the number of subordinate employees. In this way, primary user 105 may define secondary user conditions to manage secondary user accounts $330_1$-$330_m$.

When implemented via computer-executable instructions, various elements of the embodiments are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 4:
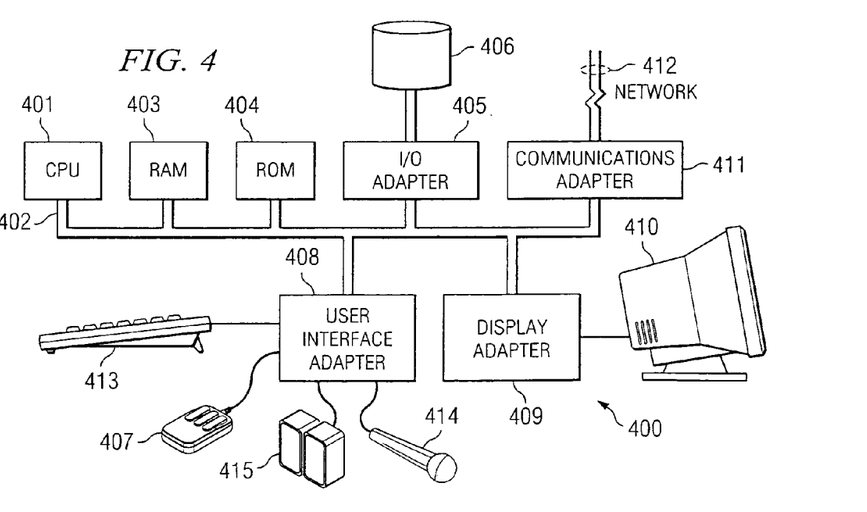
FIG. 4 is an illustration of an exemplary computer system adapted according to at least one embodiment performing user-regulated linking of user accounts to BEOs.

FIG. 4 illustrates an example computer system 400 adapted according to various embodiments for user-regulated linking. That is, computer system 400 comprises an example system on which embodiments may be implemented (such as server 102 or client computers 109 and 110 of the example implementation of FIG. 1). Central processing unit (CPU) 401 is coupled to system bus 402. CPU 401 may be any general purpose CPU, and the embodiments are not restricted by the architecture of CPU 401 as long as CPU 401 supports the inventive operations as described herein. CPU 401 may execute the various logical instructions according to embodiments. For example, CPU 401 may execute machine-level instructions according to the exemplary operational flow described above in conjunction with FIG. 2.

Computer system 400 also preferably includes random access memory (RAM) 403, which may be SRAM, DRAM, SDRAM, or the like. Computer system 400 preferably includes read-only memory (ROM) 404 which may be PROM, EPROM, EEPROM, or the like. RAM 403 and ROM 404 hold user and system data and programs, as is well known in the art.

Computer system 400 may also include input/output (I/O) adapter 405, communications adapter 411, user interface adapter 408, and display adapter 409. I/O adapter 405, user interface adapter 408, and/or communications adapter 411 may, in certain embodiments, enable a user to interact with computer system 400 in order to input information, such as keys 11 and 15.

I/O adapter 405 preferably connects to storage device(s) 406, such as one or more of hard drive, compact disc (CD) drive, floppy disk drive, tape drive, etc. to computer system 400. The storage devices may be utilized when RAM 403 is insufficient for the memory requirements associated with storing data. Communications adapter 411 is preferably adapted to couple computer system 400 to network 412 (e.g., communication network 104). User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410 to, for example, display a user interface consistent with various embodiments.

It shall be appreciated that the embodiments are not limited to the architecture of system 400. For example, any suitable processor-based device may be utilized, including without limitation personal computers, laptop computers, computer workstations, and multi-processor servers. Moreover, various embodiments may be implemented on application specific integrated circuits (ASICs) or very large scale integrated (VLSI) circuits. In fact, persons of ordinary skill in the art may utilize any number of suitable structures capable of executing logical operations according to the various embodiments.

What is claimed is:

1. A system comprising:
   a business entitlement object;
   a primary account associated with a first user, wherein a computer system establishes a link from said primary account to said business entitlement object;
   a secondary user condition for allowing a second user to link to the business entitlement object, the secondary user condition being defined by said first user, and said secondary user condition includes at least one of a time period during which said second user must link a first secondary account, a network domain from which said second user must link said first secondary account, and a number of allowed links from one or more other secondary accounts; and
   the first secondary account, wherein said second user links said first secondary account to said business entitlement object if said secondary user condition is satisfied, wherein said second user link associates said first secondary account with said business entitlement object and allows said second user future accesses to services entitled by said business entitlement object.

2. The system of claim 1 wherein said secondary user condition authorizes said second user to access only specific services within said business entitlement object.

3. The system of claim 1 wherein said first user is notified of the link of said first secondary account.

4. The system of claim 1 wherein said first user revokes the link of said first secondary account.

5. The system of claim 1 wherein said first user modifies said secondary user condition.

6. The system of claim 1 further comprising:
a second secondary user condition defined by the first user; end
a second secondary account wherein said first user designates and links to said business entitlement object said second secondary account according to said second secondary user condition.

7. The system of claim 1 wherein said first user monitors the access of said second user.

8. A method comprising:
a computer system establishing a link from a first account associated with a first user to a business entitlement object (BEO);
receiving from said first user a set of one or more secondary user conditions for allowing a second user to link to the business entitlement object, wherein said one or more secondary user conditions includes at least one of a time period during which said second user must link a first secondary account, a network domain from which said second user must link said first secondary account, and a number of allowed links from one or more other secondary accounts; and
establishing a link from a second account to said BEO according to a request from the second user and if said secondary user conditions are satisfied, wherein said second account link associates said second account to said BEO and allows said second user future accesses to services entitled by said BEO.

9. The method of claim 8 further comprising prohibiting the second user to define secondary user conditions.

10. The method of claim 8 wherein one or more of the secondary user conditions comprises authorization for the second user to access only specific services within said business entitlement object.

11. The method of claim 8 further comprising notifying said first user of the link from said second account to said BEO and of the identity of the secondary user.

12. The method of claim 8 further comprising revoking a linking of the second account according to instructions from said first user.

13. The method of claim 8 further comprising changing one or more of the secondary user conditions according to instructions from said first user.

14. The method of claim 8 further comprising:
receiving from said first user a second set of one or more secondary user conditions;
and establishing a link from a third account designated by said first user to said BEO according to a request from said first user and according to said second set of secondary user conditions.

15. The method of claim 8 further comprising providing to said first user monitoring of the access of the second user.

16. The method of claim 8 wherein establishing a link from said first account comprises:
said first user providing to a BEO provider a corresponding BEO key that authorizes access to at least one service;
said first user providing to the BEO provider instructions to link the first account; and
linking the first account to the BEO.

17. The method of claim 16 wherein establishing a link from said second account comprises:
said second user providing to a BEO provider a corresponding BEO key that authorizes access to at least one service;
said second user providing to the BEO provider instructions to link the second account; and
linking the second account to the BEO.

18. The system of claim 8 wherein establishing a link from a second account to said BEO requires no further action from said first user.

19. A system comprising:
processor means for linking an account associated with a first user to a business entitlement object that authorizes access to at least one service available on an online service system;
means for defining by said first user at least one secondary user condition for allowing at least one second user to link to the business entitlement object, wherein the at least one secondary user condition includes at least one of a time period during which said second user must link a first secondary account, a network domain from which said at least one second user must link said first secondary account, and a number of allowed links from one or more other secondary accounts; and
means for linking by said at least one second user a secondary account to said business entitlement object if the at least one secondary user condition is satisfied, wherein said second account linking associates said secondary account to said business entitlement object and allows said second user future accesses to said at least one service entitled by said business entitlement object.

20. The system of claim 19 wherein means for linking an account associated with a first user comprises one or more primary user conditions.

21. The system of claim 19 further comprising:
means for defining by said first user a second set of at least one secondary user condition; and
means for linking by said first user a third account to said business entitlement object, according to the second set of at least one secondary user condition.

22. The system of claim 19 wherein said means for linking an account associated with a first user comprises a key that authorizes access to at least one service.

23. The system of claim 22 wherein said means for linking by at least one second user a secondary account comprises a key that authorizes access to at least one service.

24. The system of claim 19 wherein said business entitlement object comprises one or more of:
a software support contract;
a hardware support contract;
a warranty; and
a gift certificate.

25. The system of claim 19 wherein said means for linking by at least one second user a secondary account require no further action from said first user.

* * * * *

UNITED STATES PATENT AND TRADEMARK OFFICE
CERTIFICATE OF CORRECTION

| | | |
|---|---|---|
| PATENT NO. | : 7,669,246 B2 | Page 1 of 1 |
| APPLICATION NO. | : 10/869765 | |
| DATED | : February 23, 2010 | |
| INVENTOR(S) | : Daniel Scott Jorgenson et al. | |

It is certified that error appears in the above-identified patent and that said Letters Patent is hereby corrected as shown below:

In column 15, line 9, in Claim 6, delete "end" and insert -- and --, therefor,

In column 15, line 52, in Claim 14, after "conditions;" insert -- and --.

In column 15, line 53, in Claim 14, before "establishing" delete "and".

In column 16, line 24, in Claim 19, after "said" insert -- at least one --.

Signed and Sealed this

Eighteenth Day of May, 2010

David J. Kappos
*Director of the United States Patent and Trademark Office*